United States Patent [19]

Fischer

[11] E Patent Number: Re. 32,727

[45] Reissued Date of Patent: Aug. 9, 1988

[54] ROTARY OFFSET SHEET PRINTING MACHINE FOR PRIME AND VERSO PRINTING

[75] Inventor: Hermann Fischer, Augsburg, Fed. Rep. of Germany

[73] Assignee: M.A.N.-Roland Druckmaschinen Aktiengesellschaft, Offenbach am Main, Fed. Rep. of Germany

[21] Appl. No.: 35,654

[22] Filed: Apr. 3, 1987

Related U.S. Patent Documents

Reissue of:

[64] Patent No.: 4,356,766
Issued: Nov. 2, 1982
Appl. No.: 308,364
Filed: Oct. 5, 1981

[30] Foreign Application Priority Data

Oct. 25, 1980 [DE] Fed. Rep. of Germany ..... 3040389

[51] Int. Cl.[4] ..... B41F 13/24
[52] U.S. Cl. ..... 101/232; 271/184
[58] Field of Search ..... 101/174, 183, 216–217, 101/729, 232; 271/184–186

[56] References Cited

U.S. PATENT DOCUMENTS

| | | | |
|---|---|---|---|
| 3,174,748 | 3/1965 | Roberts et al. | 101/232 X |
| 3,334,897 | 8/1967 | Sharkey | 101/232 X |
| 3,342,129 | 9/1967 | Weigl | 101/232 X |
| 4,222,326 | 9/1980 | Mathes et al. | 101/232 X |

FOREIGN PATENT DOCUMENTS

| | | | |
|---|---|---|---|
| 511813 | 10/1930 | Fed. Rep. of Germany . | |
| 511814 | 10/1930 | Fed. Rep. of Germany . | |
| 881043 | 6/1953 | Fed. Rep. of Germany | 101/232 |
| 1158394 | 2/1958 | Fed. Rep. of Germany | 101/232 |
| 2113634 | 9/1972 | Fed. Rep. of Germany | 101/232 |
| 2452050 | 5/1976 | Fed. Rep. of Germany | 101/232 |
| 2914362 | 10/1980 | Fed. Rep. of Germany | 101/232 |
| 289392 | 3/1953 | Switzerland | 101/183 |

*Primary Examiner*—Eugene H. Eickholt
*Attorney, Agent, or Firm*—Frishauf, Holtz, Goodman & Woodward

[57] ABSTRACT

To minimize the number of components of the printing system and require only a single impression cylinder, a sheet transport chain is carried about a second one of three rubber cylinders (3, 5, 7) to receive a sheet from the impression cylinder (2) to which the sheet is first applied for a first prime printing by a first rubber cylinder (3), the sheet being led about the second rubber cylinder and between a third rubber cylinder (7) which applies verso printing thereon, with the second rubber cylinder acting as a counter or impression cylinder for the third rubber cylinder; each one of the rubber cylinders has a plate cylinder (4, 6, 8) associated therewith, the second rubber cylinder applying the second prime print being positioned above the chain drive, the first rubber cylinder and the first plate cylinder being positioned above the impression cylinder (2) and the third blanket cylinder and the third plate cylinder being positioned below the printing cylinder, thus providing for compact construction of the respective cylinders and associated equipment such as damping fountains, ink trains, and the like, without impairment of accessibility to the components of the machine.

3 Claims, 1 Drawing Sheet

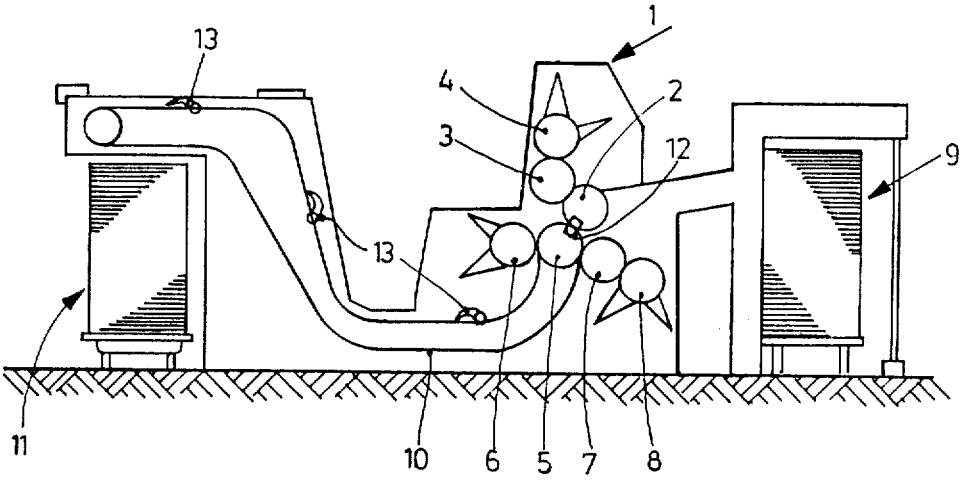
1
13
4
2
3
12
9
13
11
10
6
5
7
8

ROTARY OFFSET SHEET PRINTING MACHINE FOR PRIME AND VERSO PRINTING

Matter enclosed in heavy brackets [ ] appears in the original patent but forms no part of this reissue specification; matter printed in italics indicates the additions made by reissue.

Cross reference to related application, assigned to the assignee of the present application:

U.S. Ser. No. 308,363, filed Oct. 5, 1981, Fischer et al. *now U.S. Pat. No. 4,365,553 of Dec. 28, 1982.*

The present invention relates to rotary offset printing machines for sheet printing, and more particularly to such machines which contain a printing system capable of both prime and verso printing, in which three rubber cylinder-plate cylinder combination pairs are used, and in which a first one of the rubber cylinders, cooperating with an impression cylinder, as well as a second rubber cylinder, effect the prime printing, the third rubber cylinder effecting the verso printing, and in which the sheet is transported, at least in part, through the printing system by a chain transport device.

BACKGROUND

Printing machines of the type providing both for prime and verso printing are known, see for example German Pat. No. 881,043, Koch, especially FIG. 4 thereof. The machine described in this patent receives sheets from a gripper system for application to a printing or impression cylinder with which two rubber cylinders cooperate, each applying a prime print thereon. After transfer of the sheets to a further printing cylinder, the sheets have the reverse or verso printing applied. The then printed sheet is carried to a sheet delivery system in well known and suitable manner. Transfer from the first impression cylinder to the second impression cylinder is effected by a delivery gripper and a delivery chain system. This system requires two printing or impression cylinders, which are costly to make and require space. Additionally, the sheet which has two prime prints applied thereto is applied, with a freshly printed side, on the second impression cylinder, which may cause smearing of the just printed subject matter.

THE INVENTION

It is an object to provide a sheet rotary printing machine which requires less material than the prior art, is more compact, and provides in superior printed results.

Briefly, a chain transport system is provided which is so placed that it carries the sheet about a rubber cylinder which applies a second prime printed subject matter, grippers on the sheet transport system picking up the sheet from the impression cylinder and carrying it, in part, about the second prime printing rubber cylinder and past the third or verso rubber cylinder, in which the *second* rubber cylinder providing for the *second* prime printing acts as a counter or impression for the third blanket or rubber cylinder.

The system has the advantage that an impression cylinder, and all associated apparatus such as bearings, drive mechanisms and the like, can be saved, thus substantially reducing manufacturing costs and, additionally, permitting placement of the elements to result in a substantially smaller and more compact machine. Yet, the various additional components of the printing machine, such as the damping fountain system, inking systems, and the like, are readily accessible; the plate cylinders, rubber blanket cylinders and the impression cylinder, likewise, are accessible. The sheet to be printed is initially applied to a printing cylinder which does not carry printed subject matter; thus, auxiliary apparatus to guide the sheet at that point, such as electrostatic charging devices, suction or compressed air or blowing apparatus for special guidance of the sheet are not needed. The side carrying the prime print of the just printed sheet is not contacted with a further printing cylinder.

DRAWING

The single FIGURE is a highly schematic side view of a printing machine for double prime printing and verso printing and incorporating the subject matter of this invention.

The printing machine has a printing station 1 in which three rubber blanket cylinder-plate cylinder pairs are located between the usual side walls of the frame structure of the machine. All subject matter of the printing machine not necessary for an understanding of the present invention has been omitted from the drawings and may be in accordance with any well known and usual sheet rotary offset printing machine structure.

The sheets to be printed are received from a stack from a supply system, for example by means of grippers or the like, and conducted to an impression cylinder 2. The impression cylinder 2 grips the sheets and carries them past a first rubber blanket cylinder 3 which cooperates with a plate cylinder 4, as well known, to apply the first prime print. Thereafter, the sheets are transferred to a second blanket cylinder 5 which cooperates with a plate cylinder 6 to apply the second prime print. The rubber blanket cylinder 5 forms the counter or impression or printing cylinder for a [first] *third* rubber blanket cylinder 7 which cooperates with a plate cylinder 8 and which applies the subject matter of the verso print.

The sheet supply stack 9, from which the sheet is transported to the printing cylinder 2, can be in accordance with any well known and suitable and commercial structure, for example by means of a gripper arrangement. Upon rotation of the printing cylinder 2 and the first rubber cylinder 3, the first prime printed subject matter is applied and, upon continued rotation, the printing cylinder 2 transfer the sheet to a chain transport system 10 which is looped about the second rubber blanket cylinder 5. The chain transport system 10—which may be constructed in accordance with any well known and suitable structure—as customary has two chains carried parallel to the ends of the respective cylinder, with transverse bars extending thereacross carrying grippers 13. The grippers 13 accept the sheets from the impression cylinder 2 and are carried thereby about the rubber blanket cylinder 5, rotating in clockwise direction. The second prime printing is applied between the *second* rubber cylinder 5 and the impression cylinder 2. Thereafter, a back side or verso print is applied by the third rubber cylinder 7, and the sheet then continues to be transported by the gripper system 13 of the chain 10 to the delivery system 11 which, in its simplest form, is a stack of sheets. Upon transfer of the sheets from the impression cylinder 2 onto the chain system 10, the grippers 13 engage in a groove 12 of the blanket cylinder 5. A similar groove, of course, will be present in the impression cylinder 2 which accepts grippers, as well known.

The printing system 1 thus utilizes the blanket cylinder 5 as the blanket cylinder for one of the prime printing subject matter as well as the impression cylinder for the third blanket cylinder 7 which applies the verso print. The sheet is taken out of the printing system 1 either directly with the single chain system 10 for stacking on the stack 11; the chain system 10, with the grippers 13 thereon may, of course, also supply the sheets to other delivery apparatus, or to a further printing station which may [by] *be* similar to the printing station 1, for example, for subsequent printing thereon in prime and verso printing, respectively.

The structure can be compactly arranged. The rubber cylinder 7 and the associated plate cylinder 8 are located beneath the impression cylinder 2; the rubber blanket cylinder 5 associated with the second plate cylinder 6 is positioned above the chain transport system 10. The first rubber cylinder 3 and the associated plate cylinder 4 are located above the impression cylinder 2. The respective ink trains, as well as the damping fountain systems associated with the rubber cylinder-plate cylinder pairs, are shown only schematically; as can be seen from the FIGURE, the particular placement of the plate cylinder-rubber cylinder pairs about the impression cylinder with the specific arrangement of the path of the chain 10 provides for compact construction without impairment of accessibility of components of the printing cylinder.

Various changes and modifications may be made within the scope of the inventive concept.

I claim:

1. Rotary offset sheet printing machine for prime and verso printing having an impression cylinder (2);

three paired rubber cylinder-plate cylinder combinations (3, 4; 5, 6; 7, 8), each including a first, second and third rubber cylinder (3, 5, 7) *and a first, second and third printing plate cylinder (4,6,8), a first prime printing being applied to the sheets by the first rubber cylinder-plate cylinder combination (3,4) while the sheets are transported between the first rubber cylinder (3) and the impression cylinder (2)*;

and a transport chain system including gripper means (13) and a chain (10) to transport sheets [between the first rubber cylinder (3) and] *from* the impression cylinder (2) [for first prime printing] and [past] *partly around* the second rubber cylinder (5) for second prime printing, and further past the third rubber [printing] *cylinder* (7) for verso printing, wherein, [in accordance with the invention,]

the transport chain [10] (*10*) is carried about the second rubber cylinder (5) and receives sheets from the impression cylinder (2) and leads said sheets over part of the circumference of the second rubber cylinder (5) to thereby have the second prime printing applied, and further lead the sheets [against] *between* the third rubber cylinder (7) [between] *and* the second rubber cylinder (5) to have the verso printing applied, the second rubber cylinder (*5*) forming the counter cylinder for the third rubber cylinder (7).

2. Printing machine according to claim 1, wherein a sheet delivery system (11) is provided, and the transport chain transports the sheets from the third [blanket] *rubber* cylinder to said delivery system.

3. Printing machine according to claim 1 or 2, wherein the third rubber cylinder applying the verso printing and the associated plate cylinder (8) are located below the impression cylinder (2);

the second rubber cylinder (5) applying the second prime print and the associated plate cylinder (6) are located above the transport chain system (10);

and the first rubber cylinder applying the first prime print, and the associated plate cylinder (4) are positioned above the impression cylinder.

* * * * *